United States Patent [19]
Hayes

[11] 4,320,522
[45] Mar. 16, 1982

[54] PROGRAMMABLE FREQUENCY AND SIGNALLING FORMAT TONE FREQUENCY ENCODER/DECODER CIRCUIT

[75] Inventor: David F. Hayes, Webster, N.Y.
[73] Assignee: Harris Corporation, Melbourne, Fla.
[21] Appl. No.: 148,289
[22] Filed: May 9, 1980
[51] Int. Cl.³ .................. H03C 3/02; H04L 27/10; H03D 3/06
[52] U.S. Cl. .................. 375/48; 179/2 DP; 328/25; 329/126; 331/1 A; 331/76; 340/825.71; 375/65; 375/89
[58] Field of Search .................. 328/21, 22, 25, 155; 370/70, 108; 179/84 VF, 84 SS, 2 DP; 455/93, 142; 332/1, 16 R; 329/1, 126; 340/167 R, 147 R, 170, 171 R; 375/52, 53, 44, 45, 48, 69, 118, 80, 89; 331/1 A, 18, 76; 364/718, 719

[56] References Cited
U.S. PATENT DOCUMENTS

| | | | |
|---|---|---|---|
| 3,497,625 | 2/1970 | Hileman et al. | 370/70 |
| 3,937,882 | 2/1976 | Bingham | 179/2 DP |
| 4,069,392 | 1/1978 | Goldenberg et al. | 179/2 DP |
| 4,220,823 | 9/1980 | Littlefield | 179/2 DP |
| 4,236,248 | 11/1980 | Teramura et al. | 375/53 |

Primary Examiner—Benedict V. Safourek
Attorney, Agent, or Firm—L. Lawton Rogers, III

[57] ABSTRACT

A programmable frequency and signalling format encoder/decoder circuit is disclosed which can be used alone or with other like encoder/decoder circuits and external timing and memory circuits to create a tone frequency transmission and reception system having particular frequency and signal format requirements. The encoder provides a sine wave output signal of a selected frequency by constructing the sine wave shape from a predetermined number of sine wave weighted discrete signal segments for each output signal cycle. The width of the segments within a given output signal cycle is determined by programming the encoder with data representative of the selected frequency. To ensure accurate conformance of the frequency of the output signal with a selected frequency, the encoder further includes circuitry for varying the width of individual segments within a single output signal cycle in accordance with the selected frequency. A programmable timing circuit particularly suited for controlling operation of one or more encoder/decoder circuits is also disclosed.

39 Claims, 28 Drawing Figures

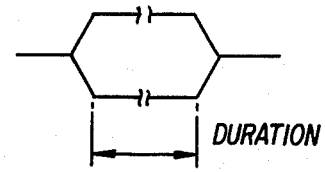
FIG. 1a
SINGLE TONE CONTINUOUS
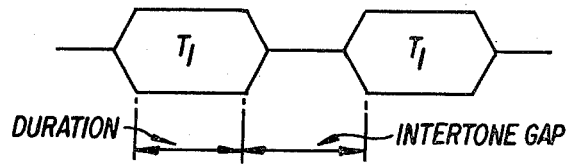
FIG. 1b
SINGLE TONE INTERRUPTED
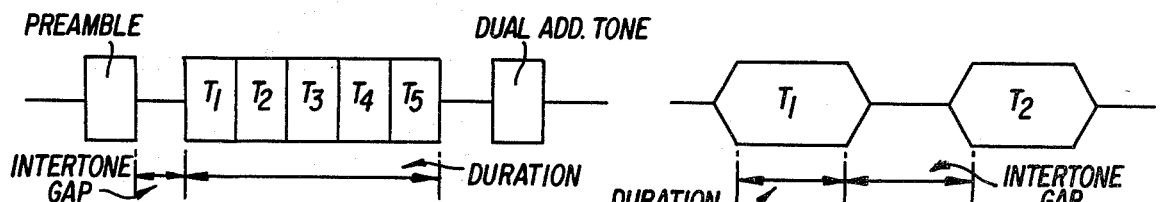
FIG. 1c
FIVE TONE SEQUENTIAL
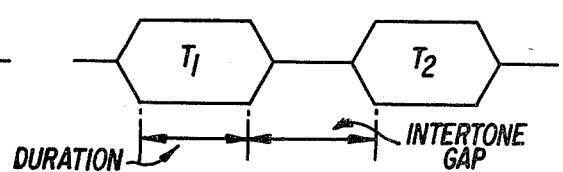
FIG. 1d
TWO TONE SEQUENTIAL
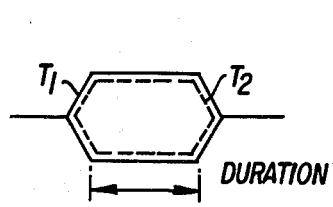
FIG. 1e
TWO TONE SIMULTANEOUS
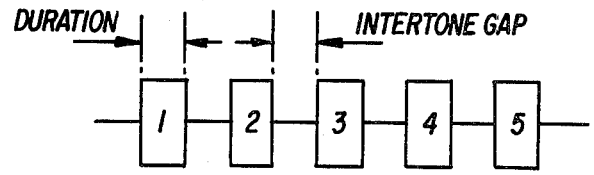
FIG. 1f
GENERAL PURPOSE
FSK FIG. 1g
FIG. 5
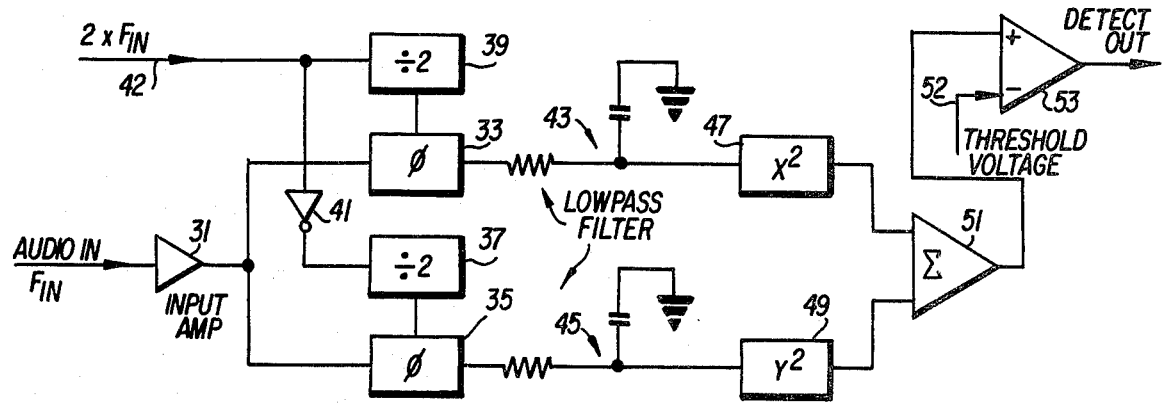

PROGRAMMABLE FREQUENCY AND SIGNALLING FORMAT TONE FREQUENCY ENCODER/DECODER CIRCUIT

BACKGROUND OF THE INVENTION

The present invention relates to frequency signalling systems and, more particularly, to tone frequency signalling systems wherein information is tone encoded for transmission to a remote location where it is tone decoded and used as control or signalling information.

Over the years, a broad range of frequencies and signal formats have been developed and are now used in present day tone frequency signalling systems. This is particularly true in the area of two-way radio and car telephone systems, as independent manufacturers have separately developed their own tone frequency signalling systems using tone frequencies and signalling formats unique to their systems. Many tone frequency signalling systems employ contactless resonant reeds, or active filters or other electronic components to accomplish the required tone frequency encoding/decoding functions. The wide range of frequencies used in the various systems has required the maintenance by manufacturers and suppliers of a large stocked inventory of standard frequency components. Moreover, the various timing requirements employed in the different signalling schemes has required the stocking of additional numerous diverse timing components.

Accordingly, a principal object of the present invention is to provide a universal frequency encoder/decoder circuit which can be inventoried and factory programmed to generate and detect the frequencies used in present day and future frequency signalling systems, thus reducing the number of frequency components which must be stocked.

Another object of the invention is to provide a universal encoder/decoder circuit which can be used alone or with other like encoder/decoder circuits and external timing and memory circuits to form a tone frequency signalling system which can be suitably signal format and frequency programmed as desired.

A still further object of the invention is to provide a universal encoder/decoder circuit which is designed around digital techniques and can be simply packaged as a large scale integrated (LSI) circuit thereby minimizing the number of parts needed to construct a desired tone frequency signalling system.

Since many selective signalling systems are used in mobile communications systems, e.g. a car telephone environment, an additional object of the invention is to provide a universal encoder/decoder circuit which has minimized power consumption and which is capable of minimizing the power consumption of external timing and memory components connected therewith.

Frequency synthesizers are often employed to provide a selected one of a multitude of output frequencies. Usually, a reference clock source is frequency divided in a programmable divider by different integer divider factors to produce a desired output frequency. Very often the exact output frequency required cannot be obtained because of the limitations of the frequency of the clock source and the integer dividing nature of the programmable divider. Accordingly, a yet further object of the invention is to provide a unique frequency encoder which more accurately generates an output signal at a selected frequency.

Many present day tone frequency signalling systems have signalling formats requiring precise timing of tones and of gaps between tone bursts. Heretofore, discrete timing circuits have been devised for each different signalling format which again requires the stocking of a large number of parts. Accordingly, yet another object of the invention is to provide a universal programmable timing circuit which is particularly useful with one or more of the universal encoder/decoder circuits of the invention or with other encoder/decoder circuits to create the timing patterns of present and future tone frequency signalling systems.

These and other objects and advantages of the invention can be seen from the following detailed description thereof provided in accordance with the accompanying drawings.

BRIEF DESCRIPTION OF THE DRAWINGS

FIGS. 1a through 1g illustrate several of the various signalling formats used in present day tone frequency signalling systems:

FIG. 1a shows a continuous single tone signalling format;

FIG. 1b shows an interrupted single tone signalling format;

FIG. 1c shows a five tone sequential signalling format having a preceeding preamble tone and a subsequent dual address tone;

FIG. 1d shows a two tone sequential signalling format;

FIG. 1e shows a two tone simultaneous signalling format;

FIG. 1f shows a general purpose signalling format; and,

FIG. 1g shows a two tone transitional (FSK) signalling format;

FIG. 5 illustrates in block diagram form the decoder circuit of the invention;

DETAILED DESCRIPTION OF THE INVENTION

Figure 2A:
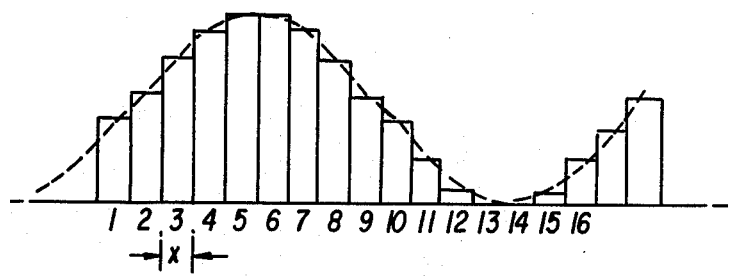
FIGS. 2a and 2b illustrate the formation of a cycle of a sine wave output signal for two different frequencies using discrete sine wave weighted signal segments.

There are four basic signalling schemes presently used in FM mobile radio applications with which the encoder/decoder circuit of the invention is particularly designed to work. These are:
(1) single and multiple-tone ON/OFF tone bursts;
(2) simultaneous tone ON/OFF tone bursts;
(3) frequency shifted tones (FSK); and
(4) phase shift keying (bi-phase PSK).

The signalling frequencies typically employed in most present day signalling schemes are tones ranging from 67 Hz to 3215 Hz. Each system uses one or more tones unique thereto residing within this range. The various systems also have unique timing for the signalling formats to account for tone start-up delays, tone signalling duration, intertone gaps and tone sequence timing. A brief description of the commonly used present day signalling schemes together with their timing information is illustrated in FIGS. 1a through 1g.

The signalling schemes illustrated in FIGS. 1a through 1g are divided into two groups, based on tone usage or mode compatability.

The systems of the first group are those in which only a frequency encode and decode function need be provided since signal timing patterns are generated externally and supplied to the encoder/decoder circuit. Timing patterns may be provided, for example, by dial pulse signals, transmit/receiving logic, FSK transitions, etc. The systems in this group are as follows:

(a) Continuous, single tone systems (an example is a continuous single sub-audible sine wave system commonly referred to as CTCSS), which has the tone signalling wave form illustrated in FIG. 1a. The continuously emitted tone is typically used for squelch circuit control in a radio receiver. Any one of several frequencies in the range of 67 Hz to 250.3 Hz is typically used for the frequency of the continuous tone.

(b) Single tone interrupted signalling systems such as illustrated in FIG. 1b wherein a continuous single tone is interrupted usually at a dial pulse rate, e.g. 8 to 12 pulses per second. Each group of tones in a burst is decimally counted and represents dialing information. The tone frequencies typically used with this system are either 1500 or 2805 Hz.

(c) Two tone transitional (FSK) systems having the signal format illustrated in FIG. 1g which represents the typical FSK signalling scheme used in most radio and car telephone environments wherein 600 and 1500 Hz are used as the signalling tones.

The second group of commonly employed signalling schemes requires the use of internal timing control for proper signal encoding and decoding. These include:

(a) Five and two tone sequential signalling systems, respectively illustrated in FIGS. 1c and 1d. In the two tone scheme signalling information is provided by sequential tone pairs with each tone being at a frequency within the range of 382.5 to 1912.5 Hz. The five tone sequential signalling system uses a first tone followed by second, third, fourth and fifth tones, each of a predetermined duration. Each five tone set is one of a group of twelve standard tone sets, each representing a pre-assigned number. For example, the digit 0 would be represented by a first tone following by a tone sequence of 600 Hz, 1983 Hz, 1633 Hz and 1633 Hz. The tone frequencies used range from 600 Hz to 2601 Hz.

(b) Multiple-tone simultaneous signalling systems as represented by the two-tone system shown in FIG. 1e. Each simultaneous tone pair represents a pre-assigned number from 1 to 16. Four frequencies in a low group and four frequencies in a high group are used in a predetermined arrangement to produce sixteen different combinations and thus numbers.

(c) General purpose format signalling systems as illustrated in FIG. 1f, wherein a sequence of up to seven tone bursts of equal duration and equal intertone gap is provided. Frequency coding of the tones is user defined and the tone frequencies used are between 300 and 3000 Hz. The general purpose format permits generation and detection of any frequency sequence with either constant band width or constant Q detection. This general purpose signalling system also permits generation of any single sub-audible tone between 67 Hz and 250 Hz and provides user adaptability for unique signalling system requirements.

Another signalling scheme having the attributes of both group 1 and group 2 is known as the two plus two tone sequential (not shown) wherein a first pair of simultaneous tones like those of FIG. 1e is followed by a second pair of simultaneous tones.

The encoder/decoder circuit of the invention is designed to generate and/or decode signalling frequencies used in all of the above described signalling systems. A particular frequency which is to be generated or decoded is programmed into the encoder/decoder circuit by externally applied frequency control data signals. When the encoder/decoder circuit of the invention is used to form a signalling system of the first group described above, timing is provided by the system environment and only the encoder/decoder circuit is used. On the other hand, when internal timing is required as for the signalling schemes in the second group, the encoder/decoder circuit of the invention is used with an associated timing circuit which provides the necessary timing signals. A particularly preferred timing circuit for use with the encoder/decoder circuit is described in detail below. In either case, the encoder/decoder circuit is also programmed with mode control data signals which configure the encoder/decoder circuit to the particular signalling system in which it is used.

A description of the manner in which tone frequencies are encoded in the invention now follows. The encoder circuit generates an output signal at a selected frequency by dividing a reference frequency $f_c$ by a dividing factor N corresponding to the selected frequency with a programmable divider and successively generating from the divided frequency $f_c/N$ with a segment counter and digital to analog converter a predetermined number of sine wave weighted signal segments (e.g. 16) for each cycle of the output frequency, the width of the signal segments changing in accordance with the dividing factor N (i.e. with selected frequency) thereby changing the frequency of the output signal.

Figure 2B:
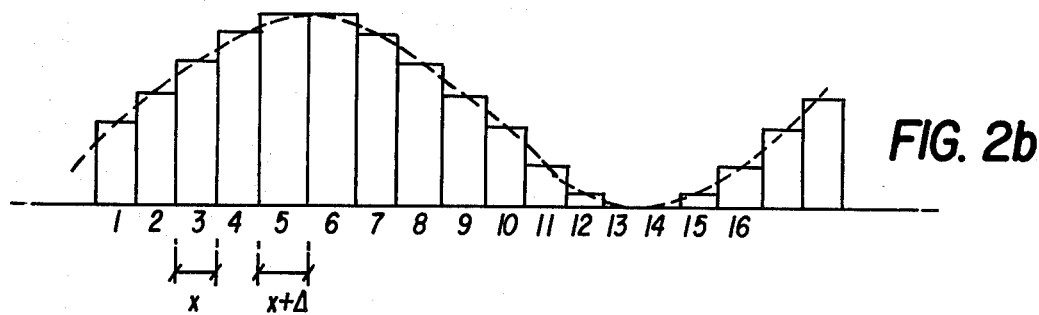

FIGS. 2a and 2b illustrate the generation of a cycle of two signals of different frequency using this approach. FIG. 2a represents a signal of higher frequency formed of 16 narrower signal segments, while FIG. 2b represents a lower frequency signal formed of 16 wider signal segments. In FIG. 2b the width (x) of each of the sixteen segments is greater than the width (x) of the corresponding segments in FIG. 2a corresponding to the use of a larger integer divider factor. This basic frequency generating approach provides low harmonic distortion, but results in a slight output frequency inaccuracy because of the inherent resolution limitations in dividing a reference frequency by an integer value.

As an example of the frequency inaccuracy problem, assume a 2.45 Mz reference frequency is used and the tone to be generated is 3,215 Hz. In order to accurately generate the tone the number of reference clock cycles per tone would be $$\frac{2.45 \text{ Mz}}{3,215 \text{ Hz}} = 762.05.$$

Assuming 16 segments are used in forming a cycle of the output frequency, each segment should have a width corresponding to 47.63 cycles of the reference frequency, $$\frac{762.05}{16} = 47.63$$

which cannot be obtained using digital dividing and counting techniques. The closest output frequency obtainable would be if each segment had a width corresponding to 48 reference frequency cycles, producing an output frequency of $$\frac{2.45 \text{ Mz}}{16 \times 48} = 3190 \text{ Hz},$$

To overcome this problem and provide a highly accurate output frequency, the encoder of the invention has the ability to temporarily alter the frequency dividing factor of the programmable divider during formation of an output frequency cycle from, for example, N to N+1, to vary the width of predetermined ones of the signal segments within an output signal cycle.

FIG. 2b illustrates the use of variable width segments (x and x+Δ) within a single cycle of the output frequency to more precisely provide a desired output frequency. Although, for the purposes of explanation, the divider factor is altered from N to N+1, alteration can take place from N to other factors in both a positive and negative direction as desired. Thus, by adjusting segment widths within a cycle, the frequency resolution of the encoder is increased.

As an example of this increased resolution, if a tone frequency of 3215 Hz is required, six of the sixteen signal segments would have a width corresponding to 47 reference frequency cycles and the remaining ten segments would have a width corresponding to 48 reference frequency cycles with a 2.45 MHz clock, producing a precise output frequency of 3,215 Hz.

Figure 3:
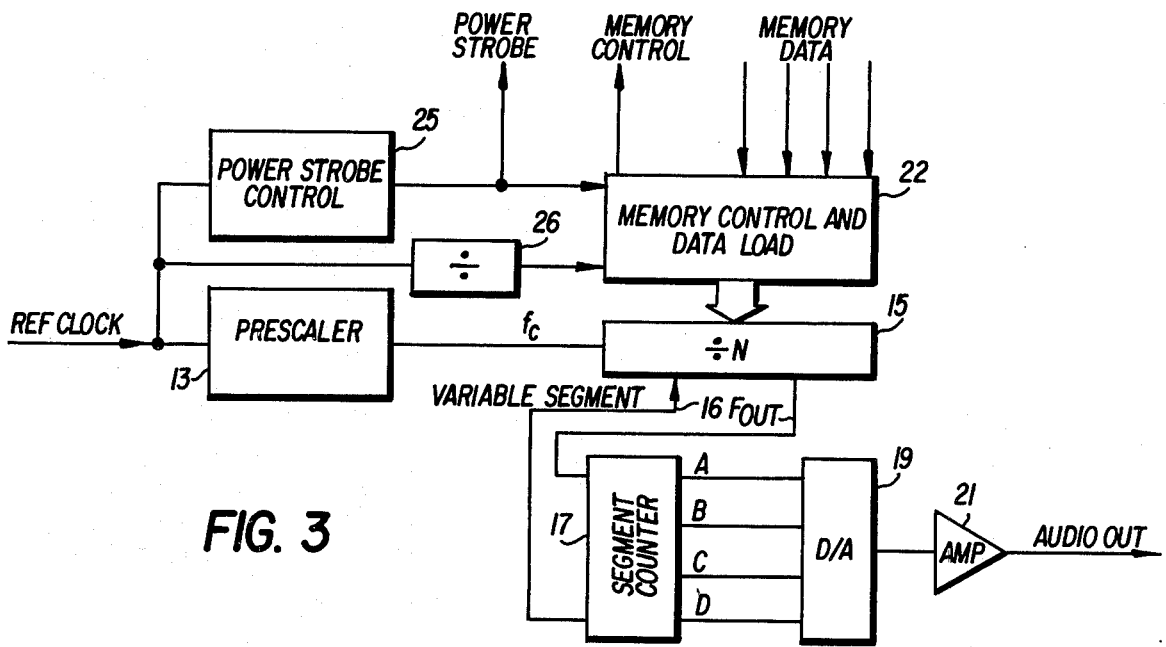
FIG. 3 illustrates in block diagram form an encoder circuit of the invention.

A high frequency resolution encoder circuit for providing an output frequency signal constructed from variable width sine wave weighted segments is illustrated in block diagram form in FIG. 3. The output of a reference frequency source, e.g. a clock signal at 2.45 Hz, is connected to a prescaler 13 which is optionally enabled depending on the particular frequency range to be generated. As well known in the art, the prescaler merely divides the reference clock signal by a predetermined amount to provide a lowered, i.e., prescaled, output frequency. The output of prescaler 13 is connected to a programmable divider 15, the output of which is connected to a segment counter 17. The segment counter 17 provides sine wave weighted digital signals on output lines (A,B,C,D) which are connected to the input of a digital to analog converter 19 which successively provides at the output thereof the sixteen segments sine wave weighted in the manner illustrated in FIGS. 2a and 2b. The output of the digital to analog converter 19 is connected to an input of amplifier 21 which provides an audio output tone signal.

The operational frequency of the encoder is determined by the divider factor N of programmable divider 15. This factor is preset into the programmable divider under control of a memory control and data load circuit 22 which addresses and receives from a memory device (not illustrated in FIG. 3) output frequency data which is used to generate the appropriate divider value N for a selected frequency. The memory control and data load circuit 22 periodically addresses the memory with a memory control signal in accordance with periodic signals generated from power strobe control circuit 25. The power strobe control circuit 25 receives the reference clock signal and provides therefrom periodic power strobe output signals which turns on the power to the memory control and data load circuit 22 as well as to additional structures as described more fully below. By periodically, rather than continuously, supplying operating power to memory control and data load circuit 22 (and other elements) with the power strobe control circuit 25, a significant amount of power savings results. Such power savings are particularly critical in battery powered signalling and communications systems such as mobile telephone systems.

Figure 4:
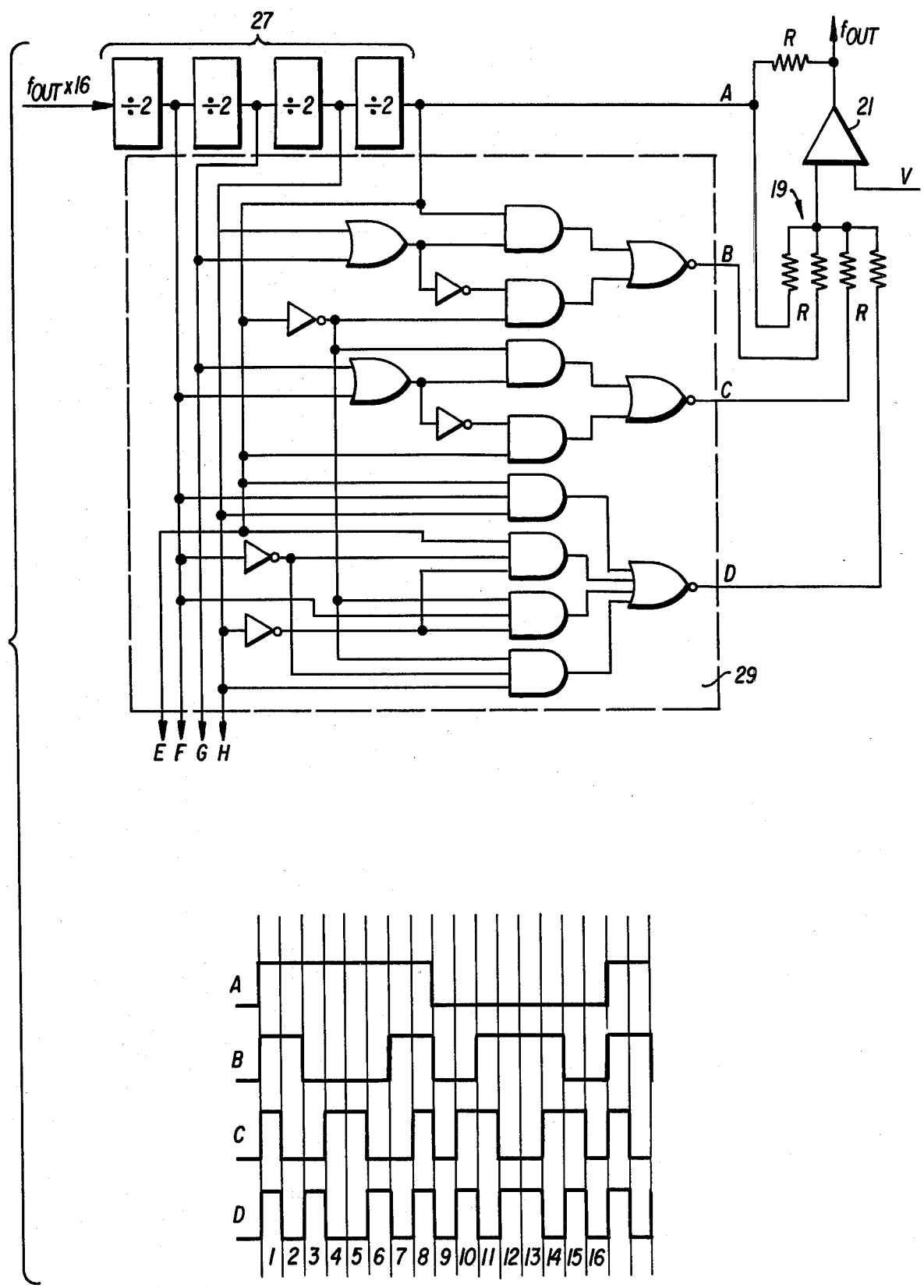
FIG. 4 A–H illustrates in block diagram form a portion of the encoder circuit illustrated in FIG. 3.

The segment counter 17 includes a tone generator decoder more fully illustrated in FIG. 4 which provides sine wave weighted segment signals to digital to analog converter 19. The tone generator decoder includes four divide-by-two bi-stable circuits forming a counter 27 and a plurality of logic devices forming a segment decoder 29 connected to the outputs of counter 27 to provide on signal lines A, B, C, D the sine wave weighted digital signals which are fed to digital to analog converter 19. Segment counter 17 also provides on output lines E, F, G, H signals from counter 27 representative of what signal segment is being formed. This information is used by a segment control 73 (FIG. 6), described in greater detail below, to provide a variable segment signal on line 16 for temporarily altering the divider factor of programmable divider 15 from N to N+1 to produce a different width for predetermined ones of the segments within a cycle of the output frequency depending on the selected output frequency. A more detailed description of how this variable segment signal is developed and applied to programmable divider 15 is provided below with reference to FIG. 6.

FIG. 4 also illustrates the signal levels provided by the segment decoder 29 on signal lines A, B, C, D during generation of the sixteen segment signals.

The decoder circuit of the invention can detect and decode any tone frequency within the range of 67 Hz to 3215 Hz, this range being typically employed in conventional signalling systems. Because various systems employ different signalling formats and tone ranges, the bandwidth of the detector portion of the decoder is made programmable in accordance with the frequency and signalling system with which it is used. In a mobile communications environment, the instantaneous signal to noise ratio varies extensively due to Rayleigh fading and multipath effects and, accordingly, the decoder has also been designed to be extremely reliable under poor signal to noise conditions.

The decoder in its most basic form is illustrated in FIG. 5 as including an input amplifier 31 to which a received audio tone signal is applied. Quadature phase detection is used for tone detection and phase detectors 33 and 35 are provided with both the applied input signal taken from the output of amplifier 31 and respective reference frequencies provided through respective divide-by-two dividers 39 and 37. The reference frequency, which is twice the frequency to be detected, is supplied to dividers 39 and 37 from the encoder circuit being taken, for example, from one of the E, F, G, H output lines from counter 27. The reference frequency provided on line 42 is applied without phase reversal to divider 39 and with phase reversal via inverter 41 to divider 37. The outputs of the phase detectors 33 and 35 are filtered by respective low pass filters 43 and 45 squared by respective squaring circuits 47 and 49 and then summed in summing amplifier 51. The time constant of low pass filters 43 and 45 determines the bandwidth of the tone detecting portion of the decoder and this time constant can be made programmable as described in further detail below. The output of summing amplifier 51 is connected to a threshold detector 53 which provides a logical output when a proper tone is detected. A threshold voltage is applied to threshold amplifier 53 on line 52 for comparison with the signal from summing amplifier 51.

The type of decoder illustrated in FIG. 5 provides wide band operation uses a minimum of external parts, is easily integrated, has excellent noise rejection, and can be configured to provide a programmable bandwidth and center frequency with substantially constant Q.

Figure 6:
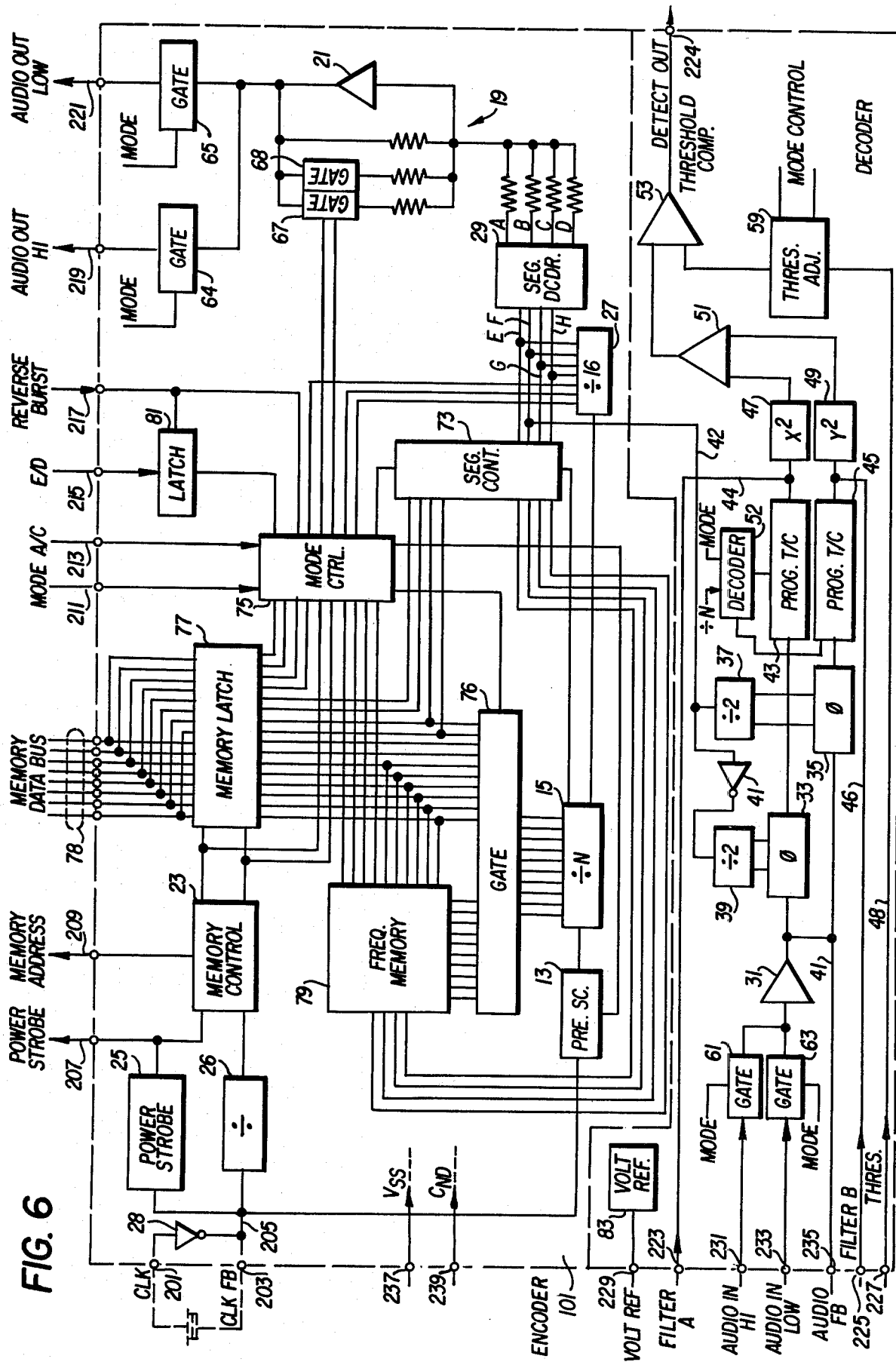
FIG. 6 illustrates in block diagram form the entire encoder/decoder circuit configured for incorporation in an integrated circuit package.

The individual encoder and decoder circuits illustrated in FIGS. 3 and 5 are preferably grouped together with operating mode and frequency control circuits in a single encode/decode circuit package as illustrated in FIG. 6. The encode/decode circuit package 101 as defined by the dotted lines contains external terminals for the various signals applied thereto and taken therefrom and for connection with various external components. The package can be conveniently integrated to provide a single package encode/decode circuit 101 having a small size and minimum power consumption.

As implemented in the encode/decode circuit 101 of FIG. 6, the encoder of FIG. 3 further includes: a pair of gates 67, 68 for selectively changing, in accordance with applied control signals, the feedback and thus operating characteristics of output amplifier 21; a pair of output gates 64, 65 for selectively passing in accordance with applied control signals, the output of amplifier 21 to one or the other of the high frequency 219 and low frequency 221 audio output terminals; a programmable prescaler 13 selectively enabled in accordance with an applied control signals; and, signal lines for presetting counter 27 with a predetermined value.

The FIG. 5 decoder, as implemented in FIG. 6 further includes: a pair of input gates 61 and 63 for selectively channeling, in accordance with applied control signals, tone signals appearing on high and low frequency input terminals 231 and 233 to the input of amplifier 31; a pair of programmable time constant circuits 43 and 45 for programming the decoder bandwidth and center frequency under control of a decoder 52 which is selectively enabled by an applied control signal; and, an adjustable threshold circuit 59 for setting an appropriate threshold for threshold comparator 53 in accordance with applied control signals.

All of the control signals operating gates 61, 63, 64, 65, 67, 68, prescaler 13, decoder 52, threshold adjust circuit 59 and the signals for presetting counter 27 originate from a mode control circuit 75 described in further detail below.

The encoder/decoder circuit 101 further includes clock terminals 201, 203 for connection with an external crystal 24 which together with inverter 28 provides a reference clock generating a reference frequency for the system on line 205. The output of the reference clock is supplied to a power strobe control circuit 25 which periodically generates a power strobe signal to a memory control 23 and to an external terminal 207 for connection with external circuits which may be connected with encode/decode circuit 101. The power strobe signal supplies energizing voltage to circuits to which it is applied. Under normal operation power strobe control circuit 25 supplies a power strobe signal lasting 2 to 5 microseconds every 0.5 seconds, which reduces external memory power consumption to approximately 0.0005% of the otherwise consumed steady state power.

The reference frequency on line 205 is divided by a divider 26 to provide periodic signals to memory control 23 causing periodic outputting of a memory address signal from the memory control 23 at terminal 209 to external memory circuits which may be connected to encoder/decoder circuit 101. Memory control circuit 23 also provides periodic signals which enable memory latch 77 which functions to input and hold data applied to the data bus terminals 78, and which operate mode control circuit 75.

Data applied to memory data bus terminals 78 include operating mode and encode/decode frequency control data signals for configuring the encoder and decoder portions of circuit 101 in accordance with selected signalling formats and operating frequencies. Mode and frequency control data is held in memory latch 77 and mode data is applied therefrom to mode control circuit 75, while frequency select data is applied to segment control 73, to gate 76 as dividing factor data N, or to frequency memory 79 as data for selecting a dividing factor N. Gate 76 selectively passes either the frequency select data from latch 77 or frequency select data from the output of frequency memory 79 to programmable divider 15 under control of an enabling output signal from mode control circuit 75.

The mode control circuit 75 is a signal decoder which interprets operating mode control signals from latch 77 and supplies appropriate enabling output control signals to load gate 76, programmable prescaler 13 (for generating frequencies below 300 Hz), a segment control 73, gates 67 and 68 of encoder amplifier 21, high and low frequency audio path output gates 64, 65 of the encoder, audio path input gates 61 and 63 of the decoder, decoder 52 and threshold adjust circuit 59.

Mode control circuit 75 is also responsive to an external mode control enable terminal 211 which receives a voltage for enabling mode control circuit 75, and a timing signal terminal 213 receiving an audio mute control signal (A/C) from an external device instructing mode control circuit 75 to block signal passage through gates 64 and 65 thereby controlling tone and intertone duration during tone encoding.

An encode/decode (E/D) terminal 215 is provided for receiving a signal indicating whether an encode or decode function is to be performed and for applying the encode/decode signal to latch circuit 81, the output of which is connected to mode control circuit 75. The encode/decode signals sets mode control circuit 75 to one of an encode or decode operation causing it to control the controllable structures in one of the encode or decode circuit portions. A reverse burst terminal 217 is provided for receiving a reverse burst signal and latching the encode/decode signal on terminal 215 into latch 81 and for instructing the mode control circuit 75 to load a preset signal pattern in counter 27 during encoding thereby shifting the phase of an encoded signal, for example, by 180°. This allows the encoder of the invention to communicate with decoders requiring a reverse burst signal.

The internal frequency memory 79 stores divisor data N for different frequencies. The particular location of memory 79 which is addressed, and thus the particular divisor data N outputted therefrom to gate 76, is controlled by frequency select signals applied to memory data bus 78 as memory addressing signals. Memory 79 may be omitted and divisor data N may be directly applied from an external memory to the memory data bus terminals 78 for application to programmable divider 15 via gate 76 and memory latch 77.

The encoder and decoder portions of the encode/decode circuit 101 function essentially as described earlier with reference to FIGS. 3 and 5. However, the operative states of gates 61, 63, 64, 65, 67, 68, and 76, programmable timing circuits 43 and 45, threshold adjust circuit 59, prescaler 13, segment control 73, and the presetting of counter 27 for a reverse burst encoding are controlled by the outputs of mode control circuit 75 which in turn are set by the mode control signals applied to mode control circuit 75 from latch 77 and the signals applied to terminals 211, 213, 215, and 217.

The encoder segment counter 17 of FIG. 3 is shown in FIG. 6 as divide-by-sixteen counter 27, segment decoder 29, and a segment control 73. Segment control 73 enables generation of variable segment widths for individual segments within a cycle of the output frequency in accordance with a selected output frequency. The output of segment control 73 controls programmable divider 15 such that it divides either by the frequency selected divisor factor N or temporarily by a factor of N+1, thus permitting an increased resolution of the encode/decode frequencies as described above. Segment control 73 receives segment adjustment data corresponding to a selected frequency from a frequency data memory, either internal (i.e., memory 79) or external to the encode/decode circuit (from latch 77). This data is decoded and compared with the data output of counter 27 (lines E, F, G, H) as the signal segments are being formed and a control signal is applied by segment control 73 on line 16 instructing programmable divider 15 to either divide by the dividing factor N set therein or temporarily by a factor of N+1. The segment adjustment data are in the form of segment codes which correspond to predetermined frequencies. Representative segment codes and the segments affected (e.g. widened) thereby are provided in Table I.

TABLE I

| SEGMENT CODE | SEGMENTS AFFECTED | |
|---|---|---|
| 0000 | None | None |
| 0001 | 1 | 9 |
| 0010 | 1, 2 | 9, 10 |
| 0011 | 1, 2, 3 | 9, 10, 11 |
| 0100 | 1, 2, 3, 4 | 9, 10, 11, 12 |
| 0101 | 1, 2, 3, 4, 5 | 9, 10, 11, 12, 13 |
| 0110 | 1, 2, 3, 4, 5, 6 | 9, 10, 11, 12, 13, 14 |
| 0111 | 1, 2, 3, 4, 5, 6, 7 | 9, 10, 11, 12, 13, 14, 15 |
| 1000 | 1 | — |
| 1001 | 1, 2 | 9 |
| 1010 | 1, 2, 3 | 9, 10 |
| 1011 | 1, 2, 3, 4 | 9, 10, 11 |
| 1100 | 1, 2, 3, 4, 5 | 9, 10, 11, 12 |
| 1101 | 1, 2, 3, 4, 5, 6 | 9, 10, 11, 12, 13 |
| 1110 | 1, 2, 3, 4, 5, 6, 7 | 9, 10, 11, 12, 13, 14 |
| 1111 | 1, 2, 3, 4, 5, 6, 7, 8 | 9, 10, 11, 12, 13, 14, 15 |

When an internal frequency memory 79 is used to store divisor data N for predetermined frequencies, mode control circuit 75 also determines from applied mode control signals whether incoming frequency select data on data memory bus terminals 78 should be applied directly to programmable divider 15 as division data (N) or as address signals to tone frequency memory 79, the division data (N) output of which is then applied through gate 76 to programmable divider 15. In other words, frequency select data supplied to the memory data bus terminals 78 may either be in the form of an address corresponding to a selected frequency, the division factor N of which is stored in frequency memory 79, or they may be directly representative of a division factor N stored in an external memory which is directly provided through gate 76 to the programmable divider 15 under control of the mode control circuit 75. The latter approach would exclusively be used if an internal frequency memory 79 is not used. When divisor factor data is derived from an internal frequency memory 79, mode control circuit 75 further provides additional addressing signals to memory 79 in accordance with applied mode select signals to select a proper division factor N which is outputted through gate 76 to programmable divider 15.

The mode control circuit 75 is also responsive to a predetermined pattern of mode select signals applied to data bus terminals 78, e.g. all mode select lines are at the same level, to control inputting of external division data and mode select signals from a memory device, e.g. PROM, external to the encode/decode circuit 101 which is read in through the memory data bus terminals 78. The mode and frequency select data will be latched and strobed in during the power strobe cycles determined by power strobe circuit 25 and under control of memory control 23. As noted, the frequency select data will be directly applied to gate 76 if the applied mode select signals indicate the frequency select data directly represents division data N. Otherwise, mode control circuit 75 will determine from the mode select signals that the applied frequency select data represent address data for internal memory 79 and will cause memory 79 to receive this address data and output a selected divisor factor to gate 76 when addressed.

When mode and frequency select data is provided from an external memory it is read into the encode/decode circuit 101 in a number M of successive eight bit bytes, typically two 8 bit bytes will be sufficient.

Both encoder output frequencies and decoder input frequencies may be divided into separately controlled upper and lower frequency bands. For this reason, the encoder output is fed to gates 64 and 65 which may be enabled to respectively pass high and low generated frequency signals under selective control of mode control circuit 75 according to selected mode data. This allows the audio output to be directed to different modulation input ports, via terminals 219 and 221, of a transmitting/receiving apparatus which the encode/decode circuit 101 may be associated. Likewise, high and low frequency input gates 61 and 63, connected with terminals 231 and 233, provided at the input of the decoder, may also be selectively controlled by the mode control circuit 75 in accordance with selected mode data. The high and low input gates permit connection of the encode/decode circuit 101 with different demodulation output ports of a transmitter/receiver. In addition, gates 64 and 65 are both blocked by mode control circuit 75 responding to an audio mute signal on A/C terminal 213 when an intertone gap is needed in the encode mode.

Since various filter configurations may also be connected to the high and low frequency input modulation and output demodulation ports of a transmitting/receiving apparatus, control of gates 61, 63, 64 and 65 by mode control circuit 75 can also be used for selection of a desired externally connected filter configuration.

Completing description of the encode/decode circuit 101, terminals 223, 225 are provided for connecting external filtering components to the low pass filter circuits 43 and 45 of the decoder by respective signal lines 44 and 46. A signal line 48 is connected to another terminal 227 to which is applied a reference threshold voltage. Encoder/decoder 101 may also include a voltage reference source 83 providing a reference voltage to an output terminal 229.

The decoder is capable of operating with a programmable band width and center frequency and with substantially constant Q, the selected bandwidth being dependent on the particular frequencies to be detected. Since the bandwidth and center frequency of the decoder vary in accordance with variations in the time constants of low pass RC filters 43 and 45, the latter are programmable and are controlled by a decoder 52 receiving division data from e.g. the output of gate 76, and an enabling signal from mode control circuit 75.

Figure 8:
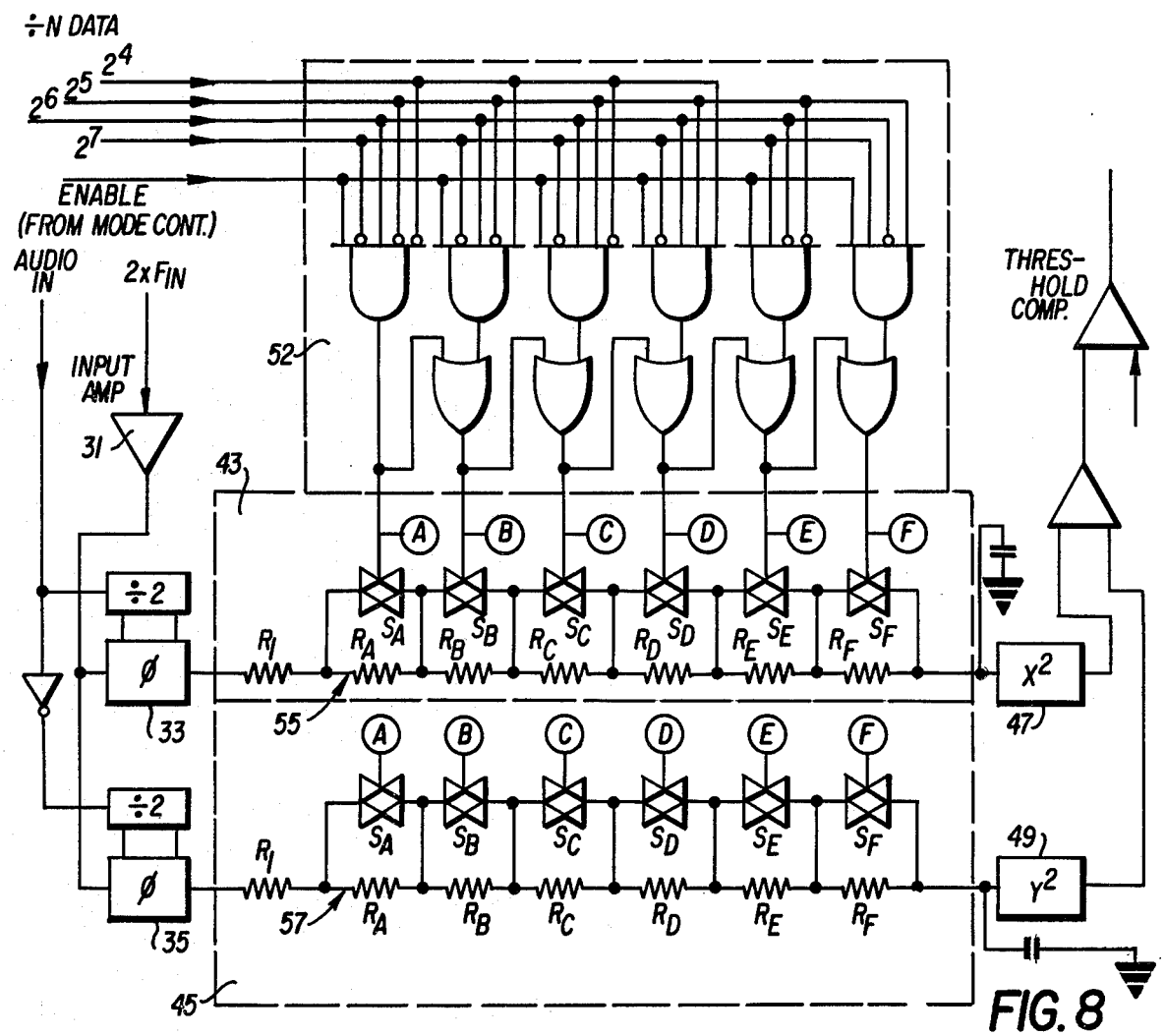
FIG. 8 illustrates a bandwidth control circuit which may be used with the decoder illustrated in FIGS. 3 and 6; and, FIGS. 9 through 14 illustrate representative tone signalling systems which can be created using one or more encoder/decoder circuits of the invention.

FIG. 8 illustrates in greater detail the programmable low pass filters 43 and 45 and decoder 52. Each low pass filter includes an respective resistor network (55, 57) which is used to change the frequency pass characteristics of filters 43 and 45. Each of the resistor networks includes a plurality of series connected resistors $R_1$, $R_A$, $R_B$, ... $R_F$ which are shunted by respective switching element SA ... SF. Decoder 52 includes a logic gating arrangement for enabling (closing) selected switches $S_A$ ... $S_F$ in filters 43 and 45 in accordance with the divisor factor N applied thereto and when enabled by the mode control circuit 75. Table II illustrates six possible bandwidth settings which may be achieved using the FIG. 8 circuit and their corresponding center frequency and frequency ranges, input divisor factors, and switch closures.

encode/decode circuit 101 and provides the functions of timing, sequencing, and option control for a selective signalling system.

Timing circuit 99 includes a mode control circuit 93 accepting and decoding mode control signals at input terminals 257, 259, 261 and 263 and applying the decoded signals as address signals to a portion of the address inputs to timing memory 91. A power strobe circuit 95 may be connected to mode control circuit 93 to supply operative power thereto in the manner of power strobe circuit 25 described earlier with respect to FIG. 6. Power strobe circuit 95 receives a strobe signal at input terminal 289 from the strobe output from and encode/decode circuit 101 and a clock signal and periodically applies energizing power to mode control circuit 93. The output of power strobe circuit 95 could also be applied to other components of timing circuit 99 as well. An option controlled decoder 97 is also provided for accepting data on option data bus 98 representing one or more system operations which may be optionally provided. Option control decoder 97 decodes the applied inputs and provides signals representing the selected options as another portion of the address input to timing memory 91. Another portion of the address inputs to timing memory 91 is connected to an encode/decode terminal 298, while a final portion of the address inputs to the timing memory 91 is provided from the output of a sequence counter 112. Thus, the outputs of mode control 93, option control decoder 97, sequence counter 112 and the encode/decode signal jointly supply an address to timing memory 91.

During operation of timer 99 sequence counter 112 sequentially steps through sixteen possible output states under control of a signal applied to its clock input and successively applies different addresses to the address inputs of the timing memory 91 following a starting address. The output of sequence counter 112 is also provided to memory address terminals 267, 269, and 271

TABLE II

| BW Setting | Center Freq. | ÷N | Freq. Range | ÷N Range | Bandwidth Range | Switches(S) (closed) |
|---|---|---|---|---|---|---|
| 1 | 2126.7 | 72 | 2392.6–1938.3 | 64–79 | +12.5%, −8.9% | ABCDEF |
| 2 | 1740.1 | 88 | 1914.1–1648 | 80–95 | +10%, −7.4% | BCDEF |
| 3 | 1472.4 | 104 | 1595.1–1379.5 | 96–111 | +8.3%, −6.3% | CDEF |
| 4 | 1276.0 | 120 | 1367.2–1205.7 | 112–127 | +7.1%, −5.5% | DEF |
| 5 | 1063.4 | 144 | 1196.3–963.1 | 128–159 | +12.5%, −9.4% | EF |
| 6 | 870.0 | 176 | 957.0–801.1 | 160–191 | +10.0%, −7.6% | F |

Thus far, description has been provided of an encode/decode circuit 101 which is capable of generating, under suitable programming of frequency and operating mode, frequency signals for use in specified signalling formats. While a single encode/decode circuit 101 can be used to encode and decode single tones between 67 Hz and 3215 Hz with timing being provided by a signal applied to audio control A/C terminal 213 or to reverse burst terminal 217, the circuit in and of itself is incapable of generating and decoding the more complex simultaneous and sequential signalling formats of many present day tone frequency signalling systems. Accordingly, one or more encode/decode circuits 101 may be required for specific signalling environments working in conjunction with one or more timing circuits and external memory devices.

Figure 7:
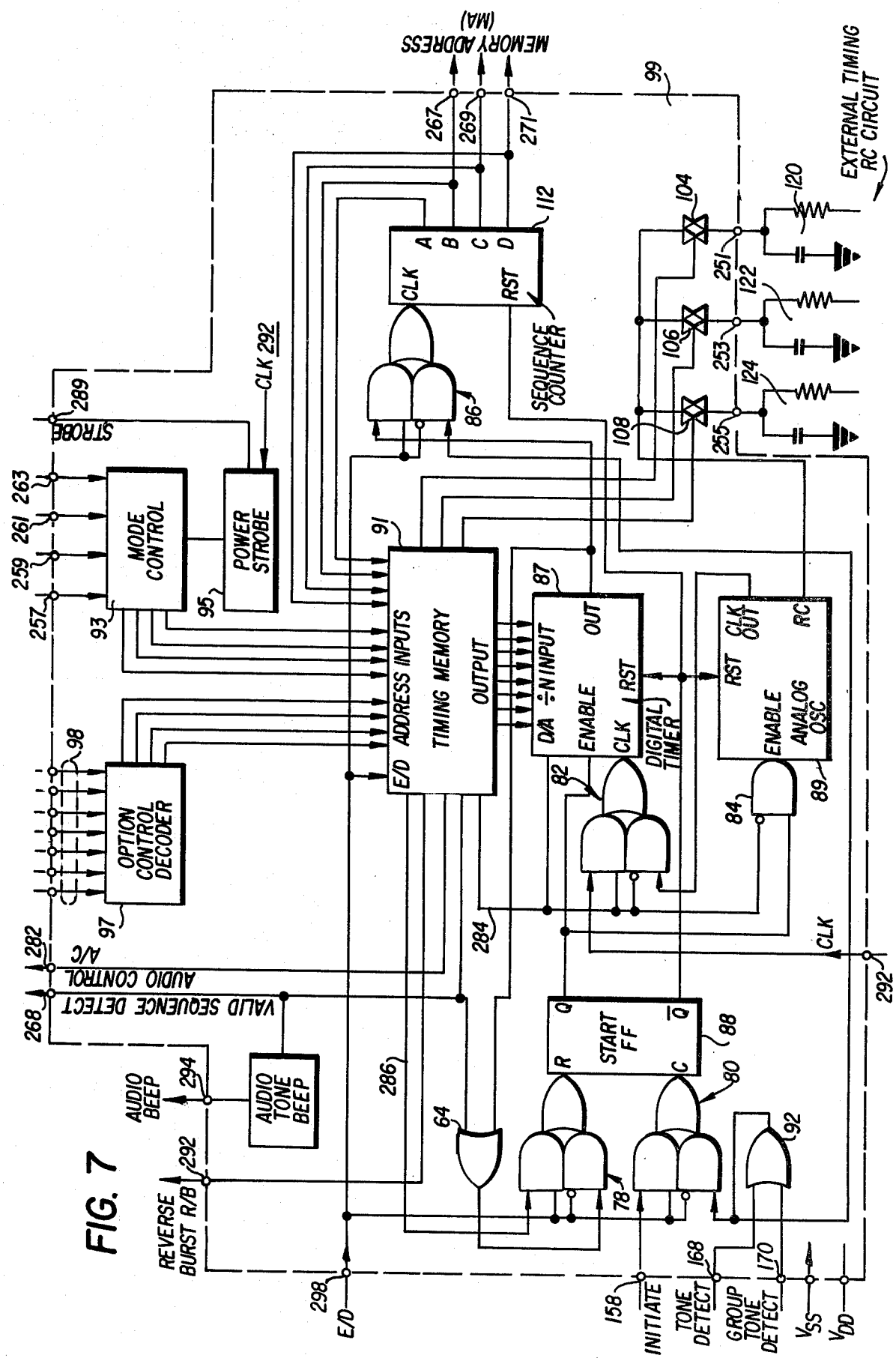
FIG. 7 illustrates in block diagram form a timing circuit which may be used with the encoder/decoder circuit of the invention.

One timing circuit which is particularly suitable for use with one or more encode/decode circuits 101 is illustrated in block diagram from in FIG. 7. The timing circuit 99 may be formed in a single package like the for successively supplying address signals to an external memory which in turn provides frequency select data to one or more encode/decode circuits 101.

Timing memory 91 has stored in its various address locations data patterns in blocks corresponding to different signalling formats and options which control the operation of timing circuit 99. Included in the data patterns are division data (divide by N) at predetermined addresses within a timing pattern block which are outputted to digital timer 87 controlling the time out duration thereof, valid tone sequence data at an address location at the end of a decoding timing pattern block, which are outputed on terminal 268, audio control mute data at predetermined address locations within an encode timing pattern block which are outputed on terminal 282, encode complete data at an ending address of an encode timing pattern block outputed on line 286, switch selection data at predetermined address locations within a timing pattern block which are outputed to selectively control one of switches 104, 106, and 108, timer selection data at a predetermined address location within a timing pattern block which are outputed on line 284 to select one of a digital or analog timing function, and reverse burst data at a predetermined address location within a timing pattern block outputted on terminal 292.

As the timing memory 91 is stepped through its address locations under control of sequence counter 112, one or more of these data appear on their corresponding output lines in accordance with the data patterns preprogrammed into the timing memory 91. The beginning address for a pattern block is selected by the initial address inputs established by option control decoder 97, mode control circuit 93, the encode/decode line and sequence counter 112 at the beginning of a sequence.

The encode/decode signal applied to terminal 298 is also applied to: logic circuit 78 to condition the same to be responsive to either the output signal of OR gate 64 or an encode complete signal applied by timing memory 91 on signal line 286; logic circuit 80 to condition the same to be responsive to either an applied initiate signal at terminal 158 or a received tone detect signal on general tone detect terminal 168 or group tone detect terminal 170 applied through OR gate 92; and, to logic circuit 86 to condition the same to be either responsive to the output of digital timer 87 or to a received tone detect signal applied to gate 92. Each of the logic circuits 78, 80 and 86 is selectively condition by the encode/decode signal to permit input signals to pass therethrough depending on whether an encode or decode state is selected. OR gate 64 receives a signal applied to terminal 268 by timing memory 91 indicating detection of a valid sequence and a signal from digital timer 87 generated when digital timer 87 times out.

Timing circuit 99 also includes a start flip-flop 88 which is clocked on in response to the output of logic circuit 80 and reset in response to the output of logic circuit 78. The Q output of start flip-flop 88 is provided to an enable terminal of digital timer 87 causing it to begin counting clock signals applied to its clock input. The clock signals are provided at the output of logic circuit 82 and are taken from either a reference clock terminal 292 connected to receive the clock reference of the system (e.g. the clock output of encode/decode circuit 101) or from a clock output of analog oscilator 89.

The logic level of a timer select signal applied to line 284 by timing memory 91 controls logic circuit 92 so that it passes one or the other of the clock signals to the clock input of digital timer 87. The timer select signal functions to select either a digital or analog timing function. For the digital timing function, analog oscillator 89 is disabled by a first level of the timer select signal which is applied as one input to enable gate 84 of the analog oscillator 89, while the digital timer is conditioned at its D/A input by this first level to divide a reference clock frequency applied on terminal 292 through logic circuit 82 by a division factor N supplied thereto from timing memory 91.

For the analog timing function, a second level of the timer select signal conditions gate 84 to pass start signal from the Q output of flip-flop 88 to the enable input of analog oscillator 89 iniating its operation. Application of this second level of the D/A terminal of digital timer 87 conditions it to divide the clock output of oscillator 89 now passed by logic circuit 82 by a predetermined constant division factor N.

If an analog timing function is selected, timing memory 91 outputs, from predetermined ones of its address locations within a timing pattern block, control signals applied to a selected one of switches, 104, 106, or 108 causing connection of one of the external timing circuits 120, 122, or 124 to an RC time constant input of analog oscillator 89. The external timing circuit fixes the clock output frequency of analog oscillator 89 and thus effectively controls the time out period of digital timer 87.

Three switches 104, 106, and 108 are provided to allow the selective connection of three separate RC timing circuits to analog oscillator 89. One such RC timing circuit may be used for setting an intertone timing duration while another may be used to set a tone timing duration. The third RC timing circuit could be used in special signalling environments to provide special inter tone gaps, for example, between a preamble tone and subsequent data tones.

The analog timing function permits generation of longer time periods than can be attained using digital timer 87 alone clocked by the reference clock frequency at terminal 292. In addition, by using analog oscillator 89 in combination with the digital timer 87 for the analog timing function, the component values for timing circuits 120, 122, and 124 can be smaller than would otherwise be the case for a particular timing period.

Although the division factor N of digital timer 87 can be fixed during an analog timing function, it may also be variable under programming of timing memory 91 for special timing situations. For example, it may be desired to set a slightly longer inter tone gap timing period, and thus a different division factor N in digital timer 87, when awaiting a tone in a decode mode than when generating tones in an encode mode.

An audio beeper circuits 90 is connected to the valid sequence detect line providing an audio signal to terminal 294 whenever a valid sequence signal is outputted from timing memory 91.

Operation of timing circuit 99 when an encode mode is selected will now be described. Initially, the system is at a reset state and an encode signal is supplied to encode/decode terminal 298 setting timing logic circuits 78, 80, 86, to an encode mode and timing memory 91 to an encode pattern block. With the system set in this manner, start flip-flop 88 is ready to receive an initiate signal on line 158. When received, the initiate signal causes flip-flop 88 to send an enable signal to digital timer 87 which is loaded with division data residing at the starting address location specified by the address input signals applied to timing memory 91. If this first address location includes timer select data instructing a digital timing operation this data is applied to signal line 284 instructing digital timer 87 to perform a timing function while maintaining gate 84 and thus analog oscillator 89 disabled. Timer 87 thereafter counts until the end of the time period set therein. When digital timer 87 times out, it provides an output signal to sequence counter 112 which steps to its next output pattern. As a result of the stepping of sequence counter 112, a new address location of timing memory 91 is addressed and its corresponding data applied to the appropriate outputs of timing memory 91 and the next timing period is executed. This operation continues until sequence counter 112 steps the timing memory 91 to an address location containing data representing the end of an encoding sequence, which data is applied to line 286 logic 78 to reset flip-flop 88, which causes resetting of the analog oscillator 89, digital timer 87, and sequence counter 112.

As the timing memory 91 is sequentially stepped through addresses corresponding to a stored timing pattern, various memory locations thereof apply audio muting control signals to audio control (A/C) terminal 282 in a pattern establishing a tone and intertone duration. The periods of tone and intertone duration are established by the timing periods of digital timer 87 which is set by the division factor data N supplied thereto from various address locations in timing memory 91 as it is sequentially addressed.

Timing circuit 99 works in a similar manner for tone decoding. In this case, a decode signal at terminal 298 conditions logic 78, 80, and 86 to operate in an decode mode and causes addressing of a decode timing pattern block in a memory 91. As a result, the start flip-flop 88 is now conditioned to received a tone detect signal applied to either line 168 or 170. When a tone detect signal is applied, logic circuit 86 reacts and steps sequence counter 112 to its next output stage, causing the next address location of timing memory 91 to be addressed. As a result, data contained in this memory location is loaded into digital timer 87. The tone detect signal on line 168 also causes the start flip-flop 88 to enable the digital timer to establish a time out period for detection of a subsequent tone. If the next tone is detected within the period established by digital timer 87, the detector tone will be applied to logic 86 causing the stepping of sequence counter 112 to its next location, the addressing of the next memory location in timing memory 91 and the inputting of new data to the digital timer 87. However, if the tone is not received before the digital timer 87 produces an output signal indicating a time out of the time set therein, start flip-flop 88 will be reset via the output signal of timer 87 which is applied to logic circuit 78 through OR gate 4 causing the resetting of timer 87, analog oscilator 89 (if used), and the sequence counter 112. The selection of a digital or analog timing function is again controlled by the signal applied to line 284 by timing memory 91.

When a proper sequence of tones properly timed is received and the sequence counter 112 is thus enabled to sequentially step through to the last memory location of a pattern block, the last address will provide a data signal to terminal 268 indicating that a valid data sequence has been detected. A signal applied to terminal line 268 also passes through OR gate 64 as well as logic 78 causing a resetting of flip-flop 88 and thus resetting of digital timer 87, analog oscilator 89 (if used), and sequence counter 112. The signal applied to terminal 268 also causes the audio tone beeper 90 to apply a tone beeper signal to terminal 294.

Thus far, description of the timing pattern produced by timing circuit 99 has been provided principally with reference to the digital timer 87. For certain signalling schemes particularly where longer timing durations are needed, analog oscillator 89 will be enabled to provide the timing function. Timing memory 91 will store in its address locations data applied to line 284 enabling the analog oscillator 89 to supply its output as the clock input to digital timer 87 and digital timer 87 to divide by a preset divisor factor N. Thus the time out period of digital timer 87 will be established by the clock output frequency of analog oscilator 89, which in turn will be controlled by one of the RC circuits 121, 122, and 124 which is selectively connected thereto under control of the timing memory 91. The analog oscillator 89 is enabled when gate 84 receives the proper signals from the Q output of start flip-flop 88 and on line 284 from timing memory 91.

As evident from the above, different timing patterns corresponding to different signalling formats can be pre-programmed into timing memory 91 as successive memory locations therein with the starting address of each pattern being set under control of the option decoder 97, mode control 93, the encode/decode line and the initial state of sequential counter 112.

The option control decoder 7 decodes the pattern of signals applied to its data inputs which signals may, for example, represent whether or not a preamble tone should be generated, whether dual address tone should generated, whether alternative tones should be generated when a group calling format is used, etc. All of this information will be stored in an appropriate timing pattern block which will be in part selected by the output of the decoder 7.

The encode/decode circuit 101 and timing circuit 99 provide a great deal of flexibility in creating signalling systems having signal formats and operating frequencies as described with respect to FIGS. 1a through 1g. FIGS. 9 through 14 represent several different signalling systems which can be constructed from these basic building block components, as well as one or more external memory devices.

Figure 9:
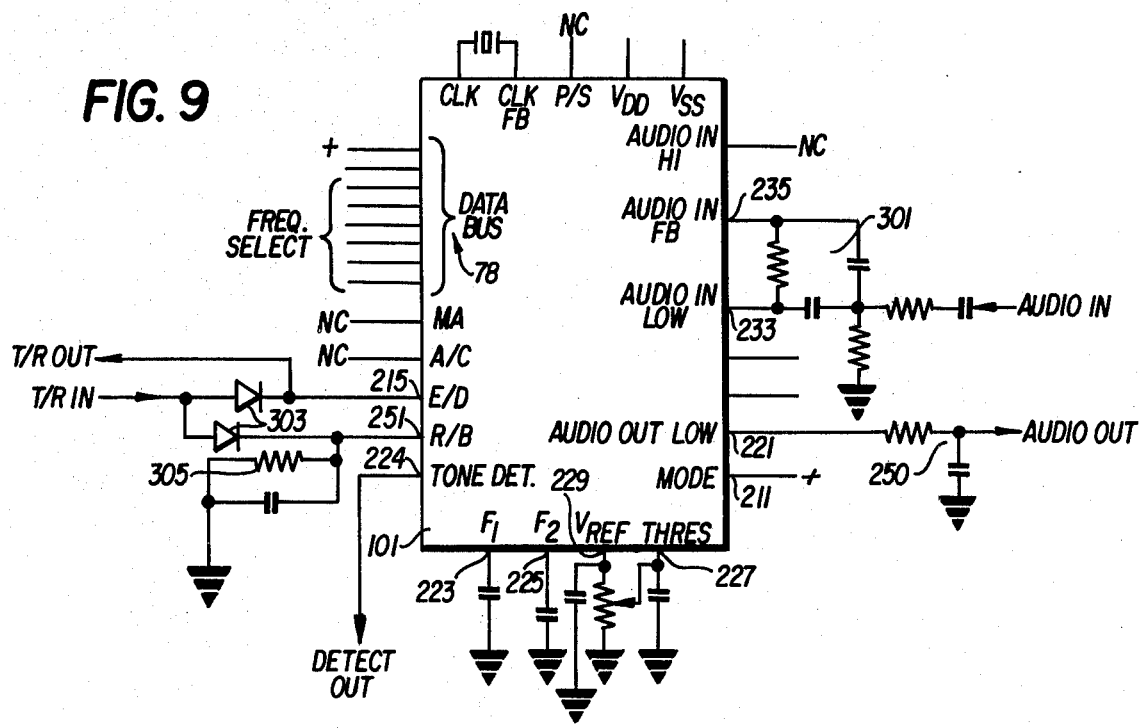

FIG. 9 illustrates the encode/decode circuit 101 configured to encode or decode a continuous, single sine-wave tone (FIG. 1a). In this instance, tone frequency and mode control data are provided to the data bus terminals 78 of encode/decode circuit 101 and mode terminal 211 is energized by application thereto of a continuous voltage signal. An audio tone signal to be detected taken, for example, from the discriminator of an associated transceiver is provided at the low audio input terminal 233 through a prefiltering circuit 301 connected to feedback terminal 235. An audio tone output signal suitable for transmission is taken from the audio output (low) terminal 221 passing through filter 250. On-off operation of the encode/decode circuit 101 is controlled by the transmit/receive logic of an associated transceiver which is connected by diodes 303 and a RC time constant circuit 305 to the encode/decode terminal 215 and reverse burst terminal 217. An output tone detect signal is taken from the tone detect terminal 224. External filtering is applied to terminals 223 and 225 for the decoder low pass filters and a threshold level for comparator 53 is determined by external biasing components connected to and between terminals 227 and 229.

Figure 10:
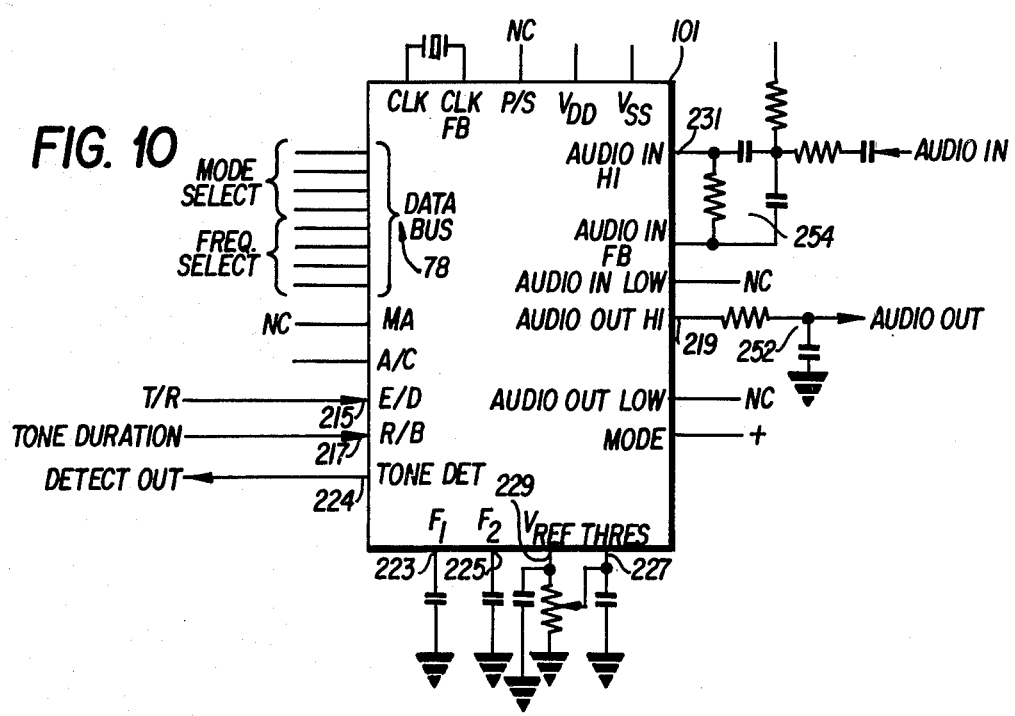

FIG. 10 illustrates the encode/decode circuit 101 used in a single tone interrupted signalling system (FIG. 1b). In this instance, the generated tone signal is taken from the audio output (high) terminal 219 via filter 252 and an audio tone input signal for detection is applied to the audio input (high) terminal 231 via filter 254. Suitable frequency select and mode select signals are provided to the data bus terminals 78 and the encode/decode selection is controlled by the transmit/receive signal applied to the E/D terminal 215 by transmit/receive logic while the tone and intertone duration timing is determined by an external tone duration signal applied to the reverse burst terminal 217. As was true of FIG. 9, a tone detect signal from the encode/decode circuit 101 is taken from the tone detect output terminal 224 and filtering and threshold components are connected to terminals 223, 225, 227 and 229.

Figure 11:
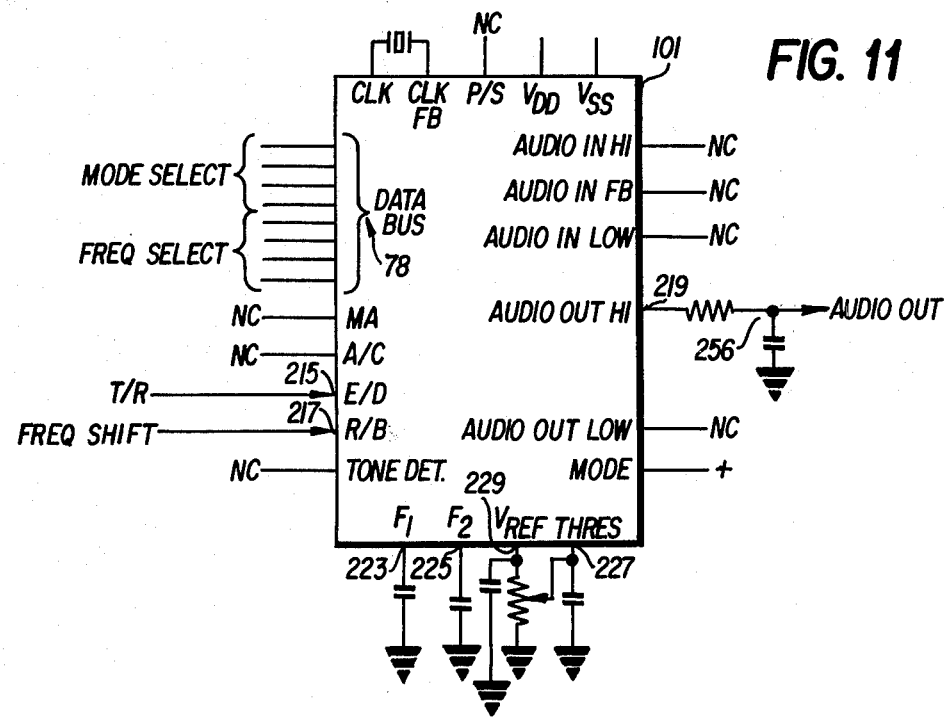

FIG. 11 illustrates the encode/decode circuit 101 used as an encoder in a two tone transitional (FSK) signalling system (FIG. 1g). In this case, a transmit/receive logic switch connected to terminal 215 controls the ON time of the encoder, while frequency shifting is controlled by a frequency shift signal applied to the reverse burst terminal 217. The output frequency is taken from the audio output (high) terminal 219 via filter 256. Both frequency select and mode select data are applied to the data bus terminals 78. The FIG. 11 arrangement could also be used as an encoder in a bi-phase PSK signalling system with the phase shift control information being applied to the reverse burst terminal 217 and the appropriate frequency control and mode select data applied to the data bus terminals 78.

Figure 12:
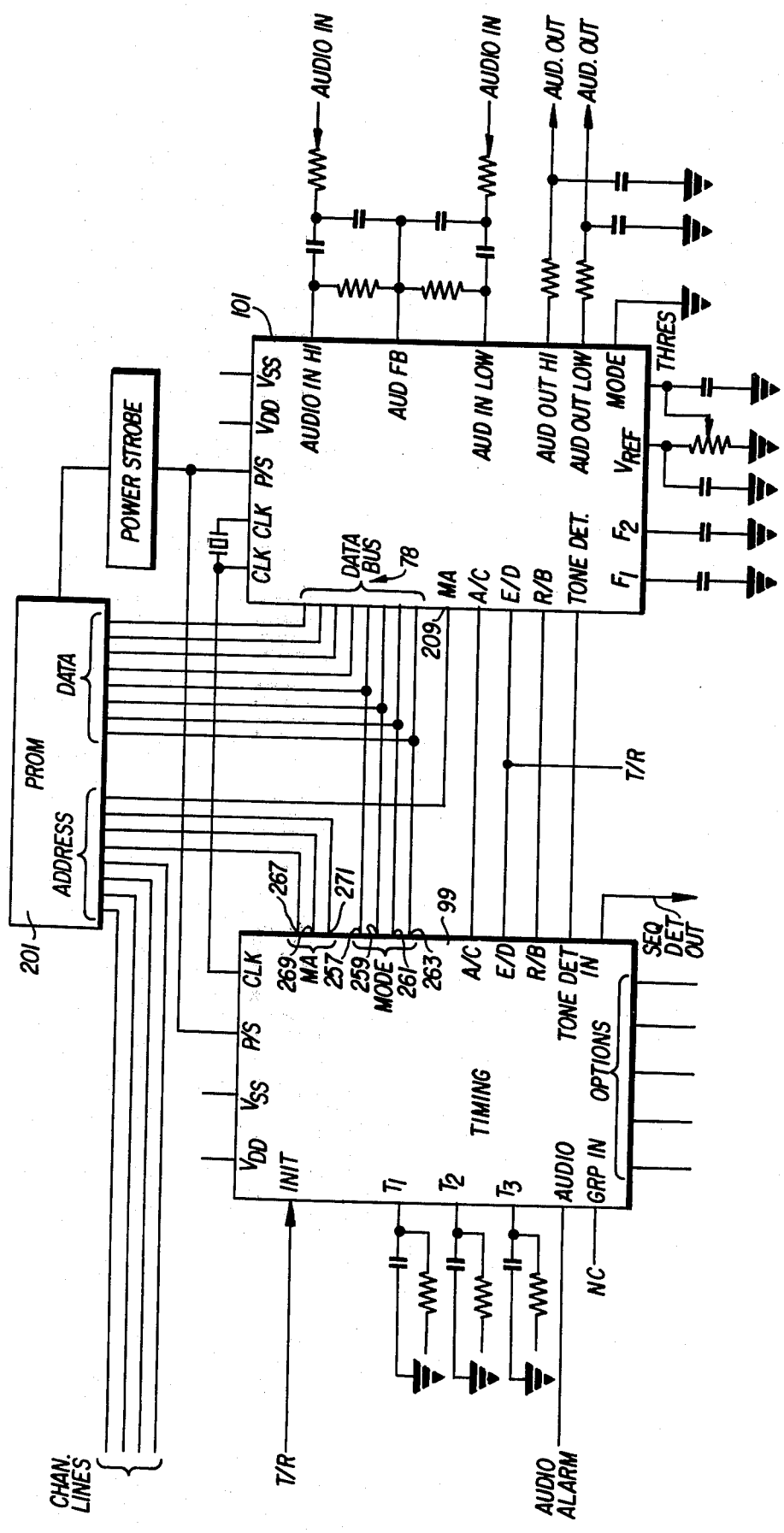

FIG. 12 illustrates the combination of an encode/decode circuit 101 with a timing circuit 99 and an external memory 201 providing mode and frequency control data from addressed memory locations. Addressing signals for memory 201 are provided on channel select lines which are directly connected to a portion of its memory address lines with remaining memory address lines being connected to terminals 267, 269, 271 of the timing circuit 99 and memory address terminal 209 of encode/decode circuit 101. Mode and frequency control data from memory 201 are applied to data bus terminals 78 of encode/decode circuit 101 and mode control terminals 257, 259, 261, 263, of timing circuit 99. The arrangement of FIG. 12 is particularly suitable for generating and detecting sequence signalling formats (e.g. FIGS. 1c, 1d, and 1f) as the timing circuit is cycled through a particular timing pattern corresponding to a selected timing sequence. The FIG. 12 system is also capable of generating and detecting tones in high and low frequency bands as shown by the audio inputs and outputs of encode/decode circuit 101.

Figure 13:
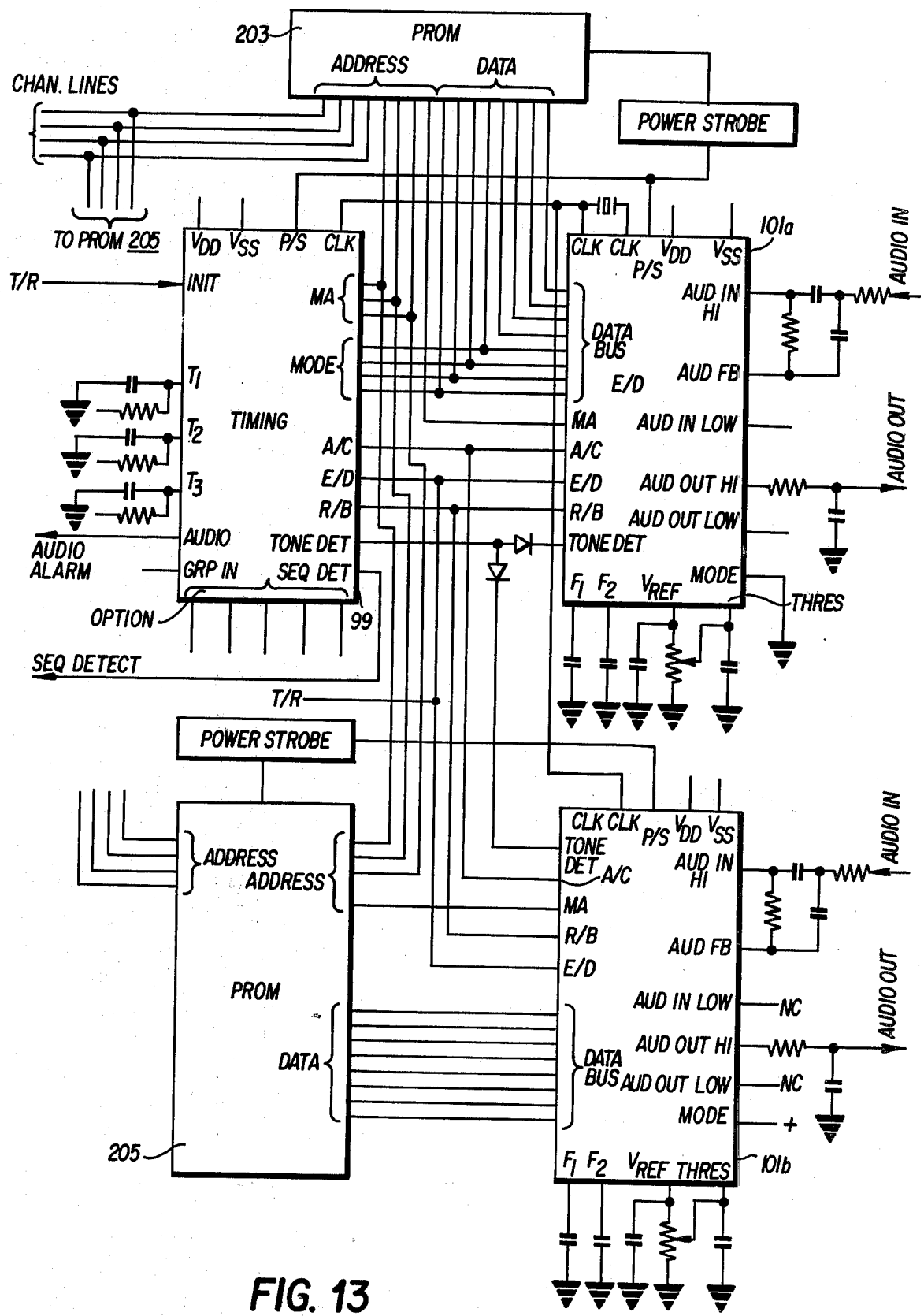

FIG. 13 illustrates the use of a pair of encode/decode circuits 101a, 101b with a timing circuit 99 and a pair of memories 203 and 205 providing mode and frequency control data to the respective encode/decode circuits 101a, 101b in a two-tone simultaneous signalling system (FIG. 1e). Each of the encode/decode circuits generates and detects one of the two simultaneous tones which are generated and detected. Timing circuit 99 controls the joint timing of the encode/decode circuits 101 as well as the joint addressing of memories 203 and 205 together with channel select lines and memory address signals from the respective encode/decode circuits 101a and 101b.

Figure 14:
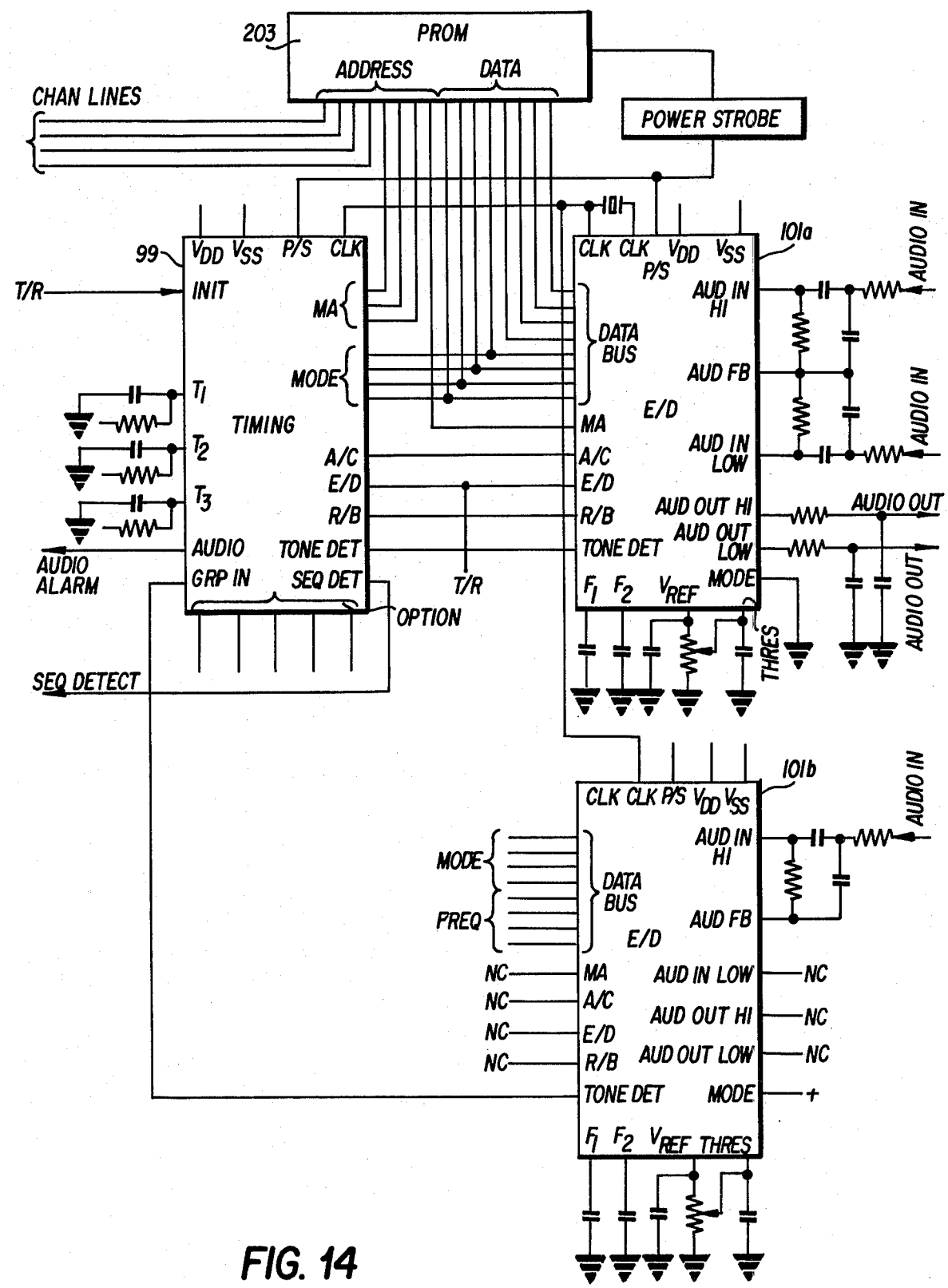

A final exemplary implementation of a signalling system utilizing the teachings of the invention is illustrated in FIG. 14 which shows the use of two encode/decode circuits 101a, 101b wherein a group call option is provided for a five tone sequential signalling system (e.g. FIG. 1c). The sequential tones are generated and detected by one of the two encode/decode circuits 101a under control of timing circuit 99 while the continuous group call tone is detected by the other of the encode/decode circuits 101b.

As described, the present invention provides an encode/decode circuit which is programmable with frequency and mode select data enabling the circuit to emmulate alone, or with other components, a multitude of different tone signalling systems. The encode/decode circuit of the invention can be particularly combined with other like circuits and/or with a preferred timing circuit to emmulate even the most complex signalling system. As a result, a desired tone signalling system can be implemented with a minimum of parts and with a relatively simple design. Moreover, the invention also provides a unique encoder circuit for accurately generating under programmed control a desired output frequency as well as a unique timing circuit for use with one or more encode/decode circuits.

While the invention has been described with respect to several specific embodiments, it is to be understood that these embodiments are merely exemplary of the invention and that many modifications can be made thereto without departing from the spirit and scope thereof. Accordingly, the invention is not limited by the description of these preferred embodiments, but only by the claims which are appended hereto.

What is claimed is:

1. A programmable frequency signal generator comprising
    a reference clock source;
    means for selecting a desired output frequency and determining a division factor N corresponding thereto;
    a programmable divider for dividing the output frequency of said reference clock source by said division factor N determined by said selecting means;
    means connected to the output of said programmable divider for forming a predetermined number of successive sine wave weighted signal segments to form a cycle of said output frequency, the width of each of said predetermined number of signal segments being determined by the division factor N of said programmable divider; and
    means responsive to said frequency selecting means and segment forming means for changing the division factor of said programmable divider during the formation of a cycle of said output frequency to vary the width of at least one of said predetermined number of signal segments relative to the width of the remainder of said predetermined number of segments in said cycle.

2. A programmable frequency signal generator as in claim 1 wherein said changing means causes said programmable divider to divide the output frequency of said reference clock source by a division factor of N+1 during formation of said at least one signal segment.

3. A programmable frequency signal generator as in claim 1 wherein said changing means is programmed with a pattern for varying the division factor N determined by said selecting means during the formation of a cycle of said output frequency to vary the width of predetermined ones of said segments in accordance with a selected output frequency.

4. A programmable frequency signal generator as in claim 1 wherein said predetermined number of signal segments is 16.

5. A programmable frequency signal generator as in claim 1 wherein said forming means generates successive sine wave weighted digital signals which are converted to successive sine wave amplitude weighted signal segments by a digital to analog converter.

6. A programmable frequency generator as in claim 2 wherein said changing means includes a segment control circuit provided with segment width varying data for a selected output frequency of said generator, said segment control circuit being responsive to said segment width varying data and the output of said forming means to shift the programmable divider division factor between N and N+1 during formation of said segments in a cycle of said output frequency causing generation of varying segment widths in each cycle of said output frequency.

7. A tone signalling encoder/decoder device comprising:
a programmable encoder for generating a selected one of a plurality of possible output frequency signals in response to applied frequency select signals, said encoder operating in a selected one of a plurality of possible operating modes, said encoder comprising:
a reference frequency source,
a programmable divider for selectively dividing the output frequency of said reference frequency source,
and
a sine wave generating circuit responsive to the output of said programmable divider for successively providing a predetermined number of sine wave weighted segment signals to form a cycle of a selected output frequency;
a programmable decoder for decoding a selected one of a plurality of possible applied input frequency signals in response to applied frequency select signals, said decoder operating in a selected one of a plurality of possible operating modes; and,
mode control means responsive to applied mode control signals for conditioning said encoder and decoder to operate in a selected one of said plurality of possible operating modes and to operate in a selected one of an encoding and decoding mode.

8. A tone signalling encoder/decoder device as in claim 7 wherein said encoder further comprises a prescaler provided between said reference frequency source and said programmable divider and said mode control means provides a signal controlling operation of said prescaler.

9. A tone signalling encoder/decoder device as in claim 7 wherein said decoder includes means for decoding an applied input frequency signal by comparing it with a reference frequency signal generated by said encoder.

10. A tone signalling encoder/decoder device as in claim 7 wherein said encoder further comprises an amplifier connected to the output of said sine wave generating circuit and controllable means for changing the feedback characteristics of said amplifier responsive to signals emitted by said mode control means.

11. A tone signalling encoder/decoder device as in claim 10 wherein the output of said amplifier is connected in common to first and second signal paths and said encoder further comprises means responsive to said mode control means for controlling the passage of signals in said first and second signal paths.

12. A tone signalling encoder/decoder circuit as in claim 7 further comprising a means for gating division factor data corresponding to a selected encoder frequency to said programmable divider, said mode control means controlling said gating means to supply said division factor data to said programmable divider.

13. A tone signalling encoder/decoder circuit as in claim 12 further comprising a memory for storing division factor data for a plurality of possible encoder output frequencies, said memory being responsive to address signals applied thereto for providing division factor data to said gating means.

14. A tone signalling encoder/decoder circuit as in claim 12 further comprising a data bus for receiving applied division factor data and mode control signals and a latching circuit connected to said data bus for latching and applying said division factor data and mode control signals respectively to said gating means and said mode control means.

15. A tone signalling encoder/decoder circuit as in claim 14 further comprising a memory control circuit for providing periodic address signals to a memory device having an output connected to said data bus.

16. A tone signalling encoder/decoder circuit as in claim 15 further comprising a power strobe circuit for periodically supplying energizing power to said memory control circuit.

17. A tone signalling encoder/decoder circuit as in claim 15 wherein said memory control operates said latching circuit to latch therein data applied to said data bus and wherein said encoder/decoder circuit further comprises a power strobe circuit for periodically supplying energizing power to said memory control circuit.

18. A tone signalling encoder/decoder circuit as in claim 7 wherein said decoder comprises:
an input amplifier to which said input signal is applied, a pair of phase detectors connected to the output of said input amplifier, said phase detectors also being respectively supplied with opposite phase reference signals generated by said encoder, respective low pass filters connected to the outputs of said phase detectors, respective signal squaring circuits connected to the outputs of said phase detectors, a summing amplifier for adding the outputs of said squaring circuits, and a threshold comparator for comparing the output of said summing amplifier with a threshold voltage.

19. A tone signalling encoder/decoder circuit as in claim 18 further comprising means for varying the filtering characteristics of said low pass filters.

20. A tone signalling encoder/decoder circuit as in claim 19 wherein said means for varying the filtering characteristics of said low pass filters comprises a decoder for decoding applied data corresponding to predetermined decoding frequencies and a switching circuit responsive to the output of said decoder for varying a component value and thus the filtering characteristics of said low pass filters.

21. A tone signalling encoder/decoder circuit as in claim 20 wherein each said low pass filter includes a plurality of serially connected resistances and said switching circuit includes a plurality of serially connected switching elements, each of which is connected in parallel with a respective one of the resistances, said decoder controlling the on-off state of said switching elements.

22. A tone signalling encoder/decoder circuit as in claim 18 further comprising a pair of input signal paths commonly connected to the input of said input amplifier, and,
means responsive to said mode control means for controlling signal passage through said input signal paths.

23. A tone signalling encoder/decoder circuit as in claim 18 further comprising means responsive to said mode control means for varying the threshold voltage applied to said threshold comparator.

24. An encoder/decoder circuit as in claim 23 further comprising respective input filter terminals connected to said low pass filters; and,
a threshold terminal coupled to said means for varying for permitting adjustment of the threshold operating characteristics of said decoder by a voltage applied to said threshold terminal.

25. An encoder/decoder circuit as in claim 23 further comprising:
means for providing a reference voltage source to a voltage reference output terminal;
an audio feedback terminal connected to the output said input signal amplifier;
a pair of applied input frequency terminals respectively connected to high and low frequency signal paths connected to the input of said input amplifier;
a pair of filter terminals respectively connected to said low pass filters and,
a pair of generated frequency output terminals respectively connected to high and low frequency signal paths commonly connected to the output of said encoder.

26. A decoder circuit comprising:
an input amplifier for receiving an applied input signal;
a pair of phase detectors connected to the output of said input amplifier;
means for respectively supplying oppositely phased identical frequency reference signals to said phase detectors;
a pair of low pass filters respectively connected to the outputs of said phase detectors;
means for altering the filtering characteristics of said low pass filters under control of applied control signals;
a pair of signal squaring circuits respectively connected to the outputs of said low pass filters;
a summing amplifier for adding the outputs of said squaring circuits; and
a threshold comparator connected to the output of said summing amplifier for providing an output signal when the output signal of said summing amplifier exceeds a predetermined level.

27. A decoder as in claim 26 wherein said low pass filters each comprise an array of interconnected filtering components and said altering means comprises switching means for electrically by-passing selected components and a decoder responsive to said control signals for operating said switching means.

28. A timing pattern signal generator comprising:
memory means storing data representing timing signal patterns, said stored data including first data representing the duration of at least one timing period;
means for addressing said memory means to cause read out of said stored data;
programmable timer means responsive to said first data read out from said memory means for establishing a timing duration corresponding to said first data and providing an output signal at the end thereof, said programmable timer means comprising:
a programmable digital timer coupled to said memory means for establishing a timing period by dividing an applied clock signal by a division factor contained in said first data,
means providing a first reference clock signal,
a programmable analog oscillator coupled to said memory means and digital timer for selectively generating a second reference clock signal at a frequency determined by frequency select data contained in said first data, and
a first logic circuit responsive to timer selection data stored in said memory for selectively applying one of said first and second reference clock signals to a clock signal input of said digital timer; and
means for initiating the timing operation of said programmable timer means.

29. A timer signal generator as in claim 28 wherein said addressing means includes a sequence counter, the output of which is applied as a portion of the addressing signals applied to said memory means, said timing signal generator further comprising a second logic circuit for selectively applying the output of said digital timer to said sequence counter.

30. A timing signal generator as in claim 29 further comprising a timing period initiate circuit for initiating operation of said programmable timing means in response to receipt of a start signal, and means responsive to the output of said digital timer for resetting said initiate circuit.

31. A timing pattern generator as in claim 30 wherein said means for resetting comprises an OR gate having a first input connected to the output of said digital timer, a second input connected to receive data from said memory means indicating completion of a signal decoding timing pattern, a fourth logic circuit for selectively applying one of the output of said OR gate and output data received from said memory means indicating completion of a signal encoding timing pattern to said initiate circuit, said initiate circuit comprising a flip-flop have a reset terminal responsive to the output of said fourth logic circuit and a clock terminal responsive to the output of said third logic circuit.

32. A timing signal generator as in claim 28 wherein the frequency of said analog oscillator is set by an RC circuit connected thereto and a switching means is provided for connecting a selected one of a plurality of RC circuits to said analog oscillator in response to said data stored in said memory means.

33. A timing signal generator as in claim 32 wherein said memory means stores second data representing the completion of generation of a selected timing pattern and third data for controlling the energized state of a signalling line at predetermined times during generation of said selected timing pattern.

34. A timing pattern generator as in claim 33 further comprising a third logic circuit for selectively applying one of an initiate signal and signal detect signal as said start signal to said initiate circuit.

35. A timing pattern generator as in claim 34 wherein said second logic circuit selectively applies one of the output signals of said digital timer and said signal detect signal to said sequence counter.

36. A timing pattern generator as in claim 35 further comprising an encode/decode control signal generating means operatively connected to control operation of said first, second, and third logic circuit.

37. A timing pattern generator as in claim 36 further comprising an enable gate responsive to the output of said initiate circuit and selection data stored in said memory means for enabling operation of said analog oscillator.

38. A timing pattern generator as in claim 28 further comprising a mode control circuit for applying mode control signals as address signals to said memory circuit.

39. A timing pattern generator as in claim 28 or 38 wherein said addressing means includes an option control decoder for decoding applied option control signals and applying decoded option control signals as address signals to said memory means.

* * * * *